United States Patent [19]
January

[11] Patent Number: 5,488,472
[45] Date of Patent: Jan. 30, 1996

[54] APPARATUS FOR DETERMINING VEHICLE WHEEL ALIGNMENT POSITIONS AND ORIENTATIONS

[75] Inventor: Daniel B. January, St. Charles County, Mo.

[73] Assignee: Hunter Engineering Company, Bridgeton, Mo.

[21] Appl. No.: 371,007

[22] Filed: Jan. 10, 1995

[51] Int. Cl.⁶ .......................... G01B 11/26; G01B 5/255
[52] U.S. Cl. ................ 356/139.09; 33/288; 356/3.12; 356/141.3; 364/559
[58] Field of Search ................ 33/288, 203.15, 33/203.18; 356/3.10, 3.11, 3.12, 4.03, 139.09, 141.3, 141.1, 152.1, 155; 364/559

[56] References Cited

U.S. PATENT DOCUMENTS

| | | | |
|---|---|---|---|
| 4,302,104 | 11/1981 | Hunter | 33/288 |
| 4,311,386 | 1/1982 | Coetsier | 33/288 |
| 4,319,838 | 3/1982 | Grossman et al. | 33/288 |
| 4,811,250 | 3/1989 | Steber et al. | 33/288 |
| 5,018,853 | 5/1991 | Hechel et al. | 33/288 |
| 5,168,632 | 12/1992 | Rimlinger, Jr. | 33/288 |
| 5,208,647 | 5/1993 | Longa et al. | |
| 5,245,555 | 9/1993 | Vilches et al. | 364/559 |
| 5,341,575 | 8/1994 | Chisum | 33/288 |

*Primary Examiner*—Stephen C. Buczinski
*Attorney, Agent, or Firm*—Polster, Lieder, Woodruff & Lucchesi

[57] ABSTRACT

Apparatus and method for determining the alignment positions and orientations of vehicle wheels includes a pair of measurement transducers, each of which is mounted on separate vehicle wheels and each of which is capable of measuring the range and relative bearing to the other. Three such pairs of measurement transducers are mounted on the vehicle wheels in conventional locations. A computer is connected to the transducers and programmed to compute the toe alignment measurements in a conventional manner. The computer is further programmed to compute the coordinates of the wheels, in an arbitrary coordinate system, from the relative range and bearing measurements. The coordinate system may be transformed relative to the sensor center line, the vehicle thrust line, the vehicle frame or body center line, or any desirable reference frame, thereby providing measurements of the actual wheel positions and alignment angles in that transformed coordinate system. To facilitate determining a coordinate system relative to the body or frame, additional transducers may be used to determine the location of the body relative to the sensors.

32 Claims, 12 Drawing Sheets

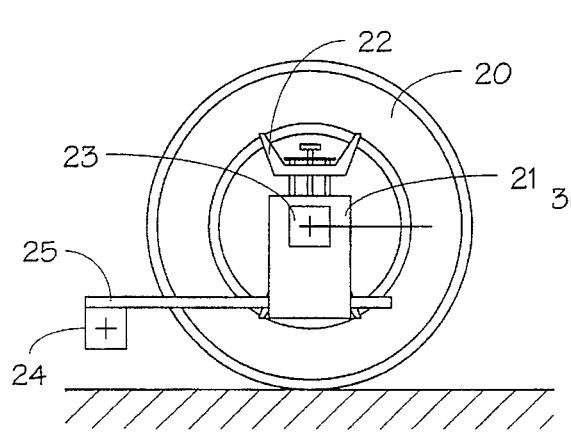
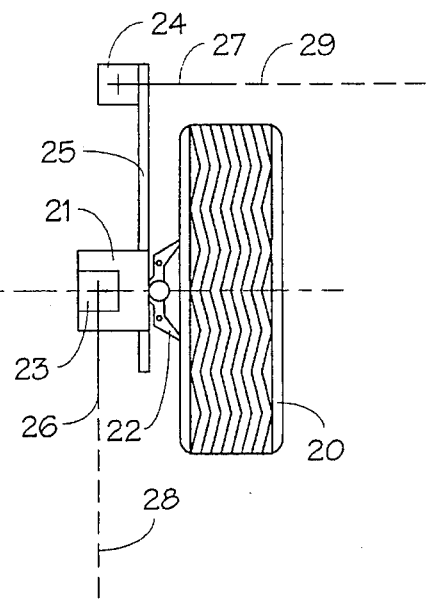
Fig. 3A    Fig. 3B
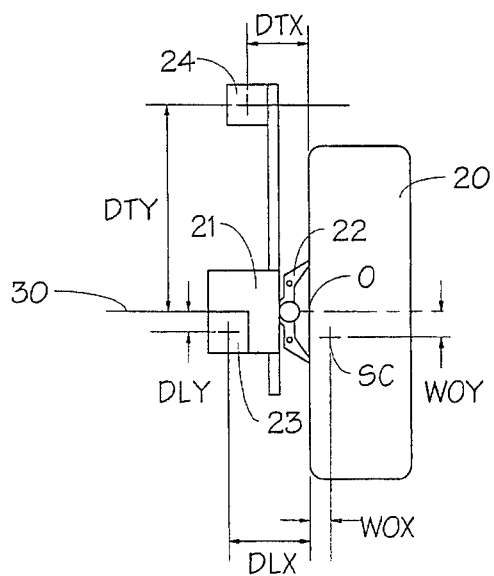
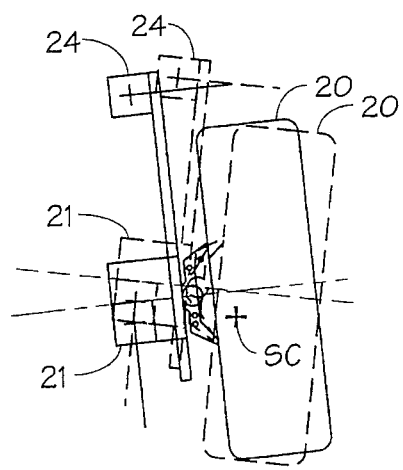
Fig. 3C    Fig. 4

APPARATUS FOR DETERMINING VEHICLE WHEEL ALIGNMENT POSITIONS AND ORIENTATIONS

BACKGROUND OF THE INVENTION

The present invention relates to vehicle wheel alignment, and more particularly to vehicle wheel alignment systems which employ electro-optical transducers to measure the toe alignment of the vehicle.

Reissued U.S. Pat. No. Re33,144 to Hunter and January and U.S. Pat. No. 4,319,838 to Grossman and January each describe a wheel alignment system which uses electro-optical transducers to determine the toe alignment angles of a vehicle. FIG. 2 of each of these patents shows six angle transducers carried by support assemblies which are mounted to the vehicle wheels. FIG. 4 of U.S. Pat. No. Re33,144 and FIG. 9 of U.S. Pat. No. 4,319,838 show the geometry of this arrangement and illustrate the six angles which are directly measured. These patents further describe (see U.S. Pat. No. Re33,144 col. 7 lines 26–39, and U.S. Pat. No. 4,319,838 col. 8 line 63 to col. 9 line 12) how the toe alignment angles are computed from the angles directly measured by the angle transducers.

Equipment of this general type has been used world-wide for more than a decade. Such equipment is capable of determining the pointing or "toe" alignment angles of the wheels relative to one or more appropriate reference axes, which is sufficient to allow proper adjustment of the alignment so as to reduce tire wear and provide for safe handling.

A limitation of such systems is that the measurement transducers measure only angles and do not measure distances, and thus are incapable of measuring the actual or relative positions of the wheels. Only the relative pointing directions of the wheels can be measured. Under certain conditions, such as when wear or damage to the suspension or steering components is suspected, it would be advantageous to actually measure the locations of the wheels relative to each other, the vehicle body, frame, thrust line, or other reference frame.

SUMMARY OF THE INVENTION

Among the various objects and features of the present invention may be noted the provision of a wheel alignment system which measures the relative positions of the vehicle wheels.

A second object is the provision of such a system which measures the positions of the vehicle wheels relative to the vehicle body, vehicle frame, thrust line, or other reference frame.

A third object is the provision of such a system which is usable for many different types of vehicles.

A fourth object is the provision of such a system which is easy to use.

Other objects and features will be in part apparent and in part pointed out hereinafter.

Briefly, apparatus of the present invention is directed to measuring the separation distances between the measurement transducers in addition to the angles ordinarily measured. These "range and bearing" measurements are used to compute the coordinates of the wheels in an arbitrary coordinate system. The coordinate system is then transformed to be relative to the sensor center line, the vehicle thrust line, the vehicle frame or body center line, or any desirable reference frame. This provides measurements of the actual wheel positions and alignment angles in that adjusted coordinate system.

BRIEF DESCRIPTION OF THE DRAWINGS

FIG. 3A is an elevation view of a single vehicle wheel on which is mounted a sensor assembly via a wheel clamp or adapter;

FIG. 3B is a plan view of a single vehicle wheel on which is mounted a sensor assembly via a wheel clamp or adapter;

FIG. 3C is a plan view of a single vehicle wheel on which is mounted a sensor assembly via a wheel clamp or adapter, similar to FIG. 3B, showing the offset distances of the transducers in the sensor from the mounting surface of the wheel, as well as the scrub radius of the wheel;

FIG. 4 is plan view of a single vehicle wheel on which is mounted a sensor assembly via a wheel clamp or adapter, showing the assembly rotated or "steered" to two separate positions about the wheel steering center;

Similar reference characters indicate similar parts throughout the several views of the drawings.

DETAILED DESCRIPTION OF THE PREFERRED EMBODIMENT

Figure 1:
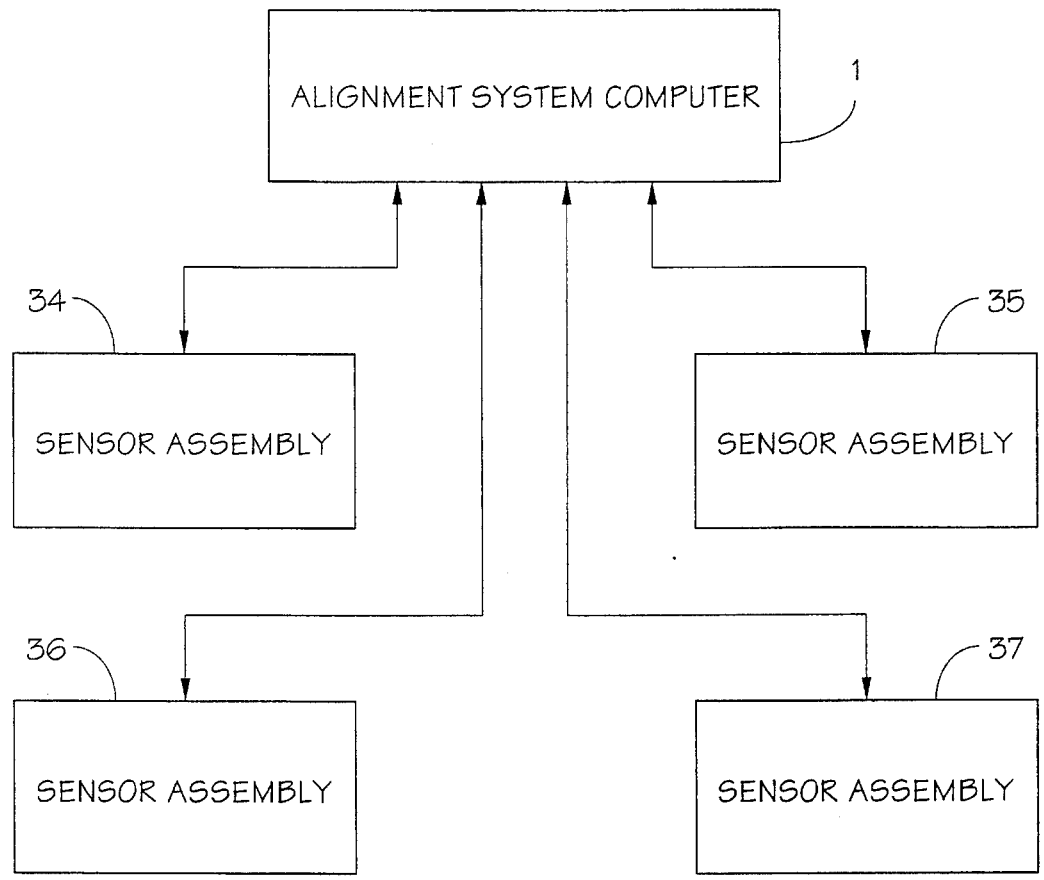
FIG. 1 is a block diagram of various components of the present invention.

It is preferred that the present invention be embodied in a computer controlled vehicle wheel alignment system, such as those shown in U.S. Pat. No. Re33,144 to Hunter and January and U.S. Pat. No. 4,381,548 to Grossman and January, the disclosures of which are incorporated herein by reference. Such a system typically includes a plurality of sensor assemblies, described below, in communication with an alignment system computer 1. A block diagram of such a system is shown in FIG. 1. The sensor assemblies are connected to the system computer via conventional communications channels, such as hardwired channels, infrared communication channels, or radio channels. Alternatively, the processing functions of the system computer may be distributed among the sensor assemblies themselves. For clarity, the system is described herein as including alignment system computer 1 which is programmed to perform the operations and computations hereinafter described.

Figure 1A:
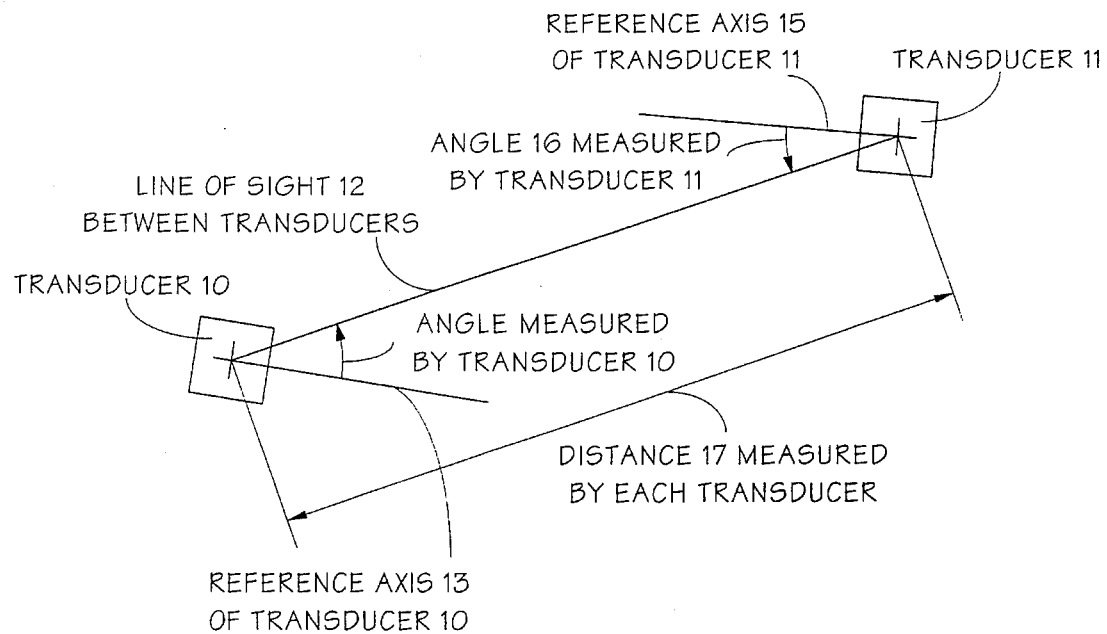
FIG. 1A is a plan view of two transducers which operate as a cooperative pair, showing the separate angles and the common distance each measures.

FIG. 1A shows a pair of transducers 10 and 11 which, as will become apparent, are disposed in separate sensor assemblies in communication with the alignment system computer. Transducer 10 and transducer 11 have and share a common line of sight 12 between themselves. Transducer 10 further has a reference axis 13, such that it measures the angle 14 between its reference axis 13 and the line of sight 12. Similarly, transducer 11 further has a reference axis 15, such that it measures the angle 16 between its reference axis 15 and the line of sight 12. The two transducers each also measures the distance 17 from one to the other along the common line of sight 12. Note that, since the distance measured is along a common line of sight, it is not necessary that both transducers measure the distance. It would be entirely sufficient for only one of the two transducers to measure the distance, or even to employ one or more separate transducers to measure the distance. Two transducers which share a common line of sight and operate in this general manner are termed a "cooperative pair".

Figure 1B:
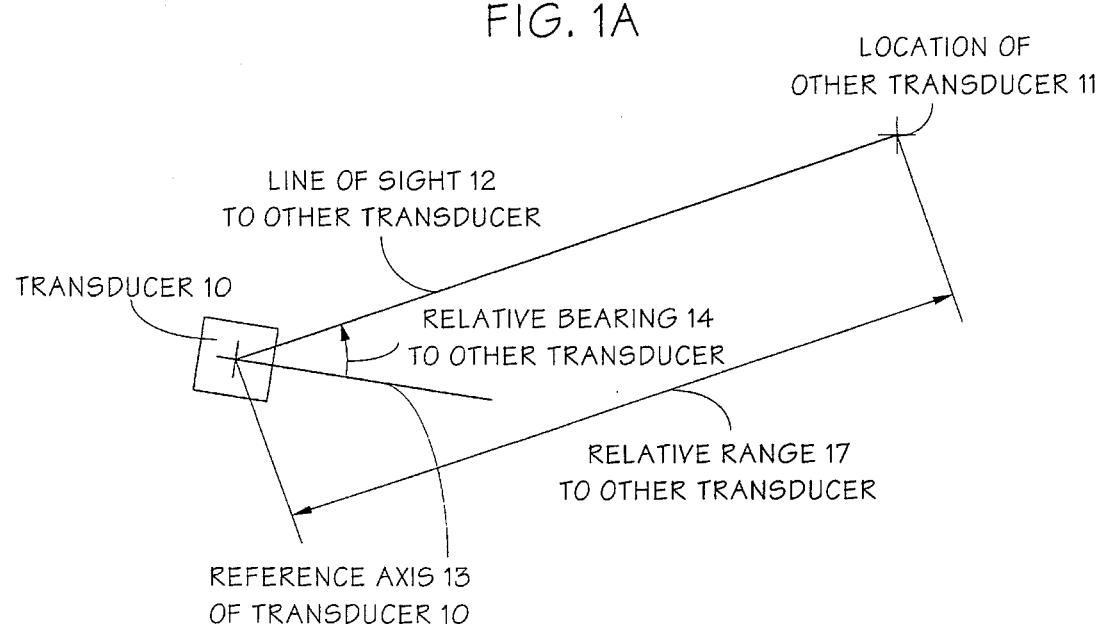
FIG. 1B is a plan view of a single transducer, showing the "range and bearing" it measures to another transducer.

FIG. 1B shows a single transducer of a cooperative pair of transducers. A single transducer 10 is associated via a line of sight 12 to another transducer 11. The transducer 10 measures the "relative bearing" 14 to the other transducer 11 as the angle between the common line of sight 12 and its own reference axis 13. The transducer 10 measures the "relative range" 17 to the other transducer along the line of sight 12. The location of the other transducer 11 relative to the transducer 10 can be determined from the relative range 17 and relative bearing 14 measured by the transducer, as will be shown presently.

Figure 2:
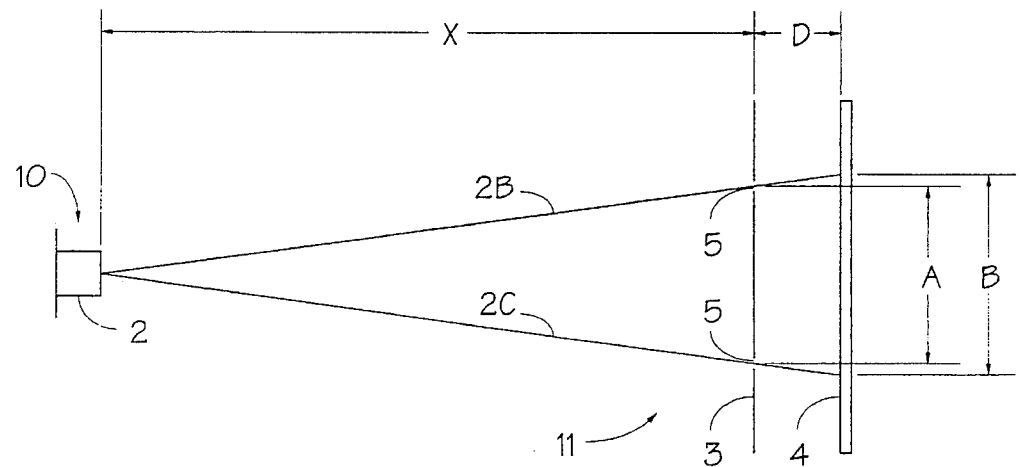
FIG. 2 is a schematic illustrating the determination of distance between transducers.
Figure 2A:
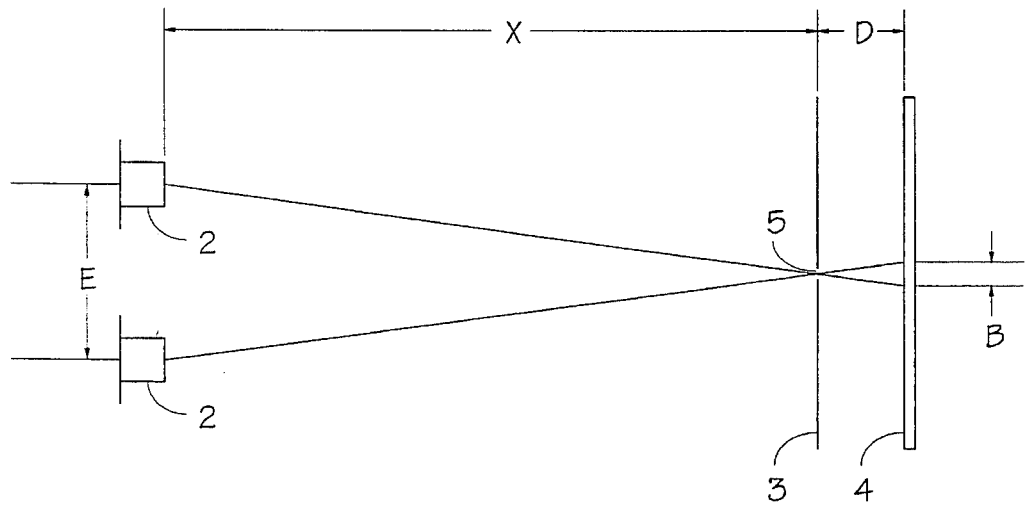
FIG. 2A is a view similar to FIG. 2 illustrating an alternative method of determining distance between transducers.

Although the precise method by which the transducers measure the distance between them is not part of the present invention, illustrative apparatus are shown in FIGS. 2 and 2A. It should be noted that the measured distance between pairs of transducers can be either wheelbase or track width, depending upon which cooperative pair is being used to make the measurement.

For determining the distance between transducers 10 and 11 using the apparatus of FIG. 2, an emitter 2 in transducer 10 projects radiation (preferably infrared light, although other frequencies could also be used) in a beam toward a mask 3 and a detector 4 in transducer 11. (It should be understood that transducer 11 preferably includes a similar emitter 10 and transducer 10 includes a similar mask 3 and detector 4, so that either transducer may perform the various functions required to determine the distance between them.) In the apparatus of FIG. 2, it is preferred that the mask have two slits 5 disposed as shown. It is also preferred that detector 4 be capable of accurately determining the distance between peaks in light distribution falling thereon, as is explained below. It has been found that a CCD detector adequately satisfies those requirements.

Emitter 2 in combination with the two slits 5 constitute means for projecting two spatially separated images upon detector 4. In practice the result is a pair of peaks on the detector disposed where the rays 2B and 2C strike the detector. A procedure for locating those peaks using a CCD linear array detector 4 is described in U.S. Pat. No. 5,018, 853, which is incorporated herein by reference. Of course many other methods of locating such peaks could also be used. The active pixel array detectors have the property that such peaks can be located, both relative to each other and relative to some arbitrary reference from the output of the detector. The output of detector 4, therefore, provides the distance "B" (the separation of the two peaks in the light distribution) to a microprocessor (not shown) which is preferably physically contained in the corresponding sensor assembly. Alternatively, the separation of the two peaks may be supplied directly to system computer 1 over the corresponding communication channel.

Note that the distance between peaks on detector 4 changes as the distance "X" between the two transducers change. The other two distances shown on FIG. 2, namely "D" and "A" are fixed. Distance "D" is the distance between the mask 3 and detector 4 (this distance is not shown to scale in FIG. 2). Distance "A" is the distance between the two slits 5 in the mask. From inspection of FIG. 2, and applying the law of similar triangles, it can be seen that $A/X=B/(X+D)$. Solving for X gives $X=(A*D)/(B-A)$. Since A and D are known, and B is the measured separation of the peaks, the microprocessor has all the information needed to determine the distance between transducers 10 and 11.

Note that although a single emitter and a mask with two slits is shown in FIG. 2 for projecting a pair of radiation peaks on the detector, a pair of emitters and a mask with a single slit could be used instead. Such a configuration is shown in FIG. 2A. In this configuration, the distance "E" between the pair of emitters 2 is known, as is distance "D," while the distance "B" between the two peaks is measured. Since $X/E=D/B$, the distance between transducers with this configuration is $X=(D*E)/B$. It should be realized that dimensions E and D are fixed, while dimension B varies with X. Due to manufacturing tolerances, dimension D will vary somewhat from unit to unit. This variation may cause the value of dimension B to vary from unit to unit as well, but can be compensated for during initial calibration of the unit.

It should be understood that using the configurations of FIGS. 2 or 2A results in an image on detector 4 having two peaks. The peaks appear at two different positions on the CCD pixel array but are centered about the true line of sight. It is preferred that the average of these two positions be determined and that the desired angle be determined from the averaged value.

FIG. 3A shows an elevation view of a single vehicle wheel 20 on which is mounted a sensor assembly 21 via a wheel clamp or adapter 22. Sensor assembly 21 has mounted therein two transducers 23 and 24. Longitudinal transducer 23 is preferably mounted on the axis of rotation of the wheel 20 in a position to be in longitudinal line of sight with a cooperative transducer which is mounted in a similar position on another wheel at the same side of the vehicle. Transverse transducer 24 is preferably mounted at the end of the toe arm 25 in a position to be in transverse line of sight with a cooperative transducer which is mounted in a similar position on another wheel at the other side of the vehicle. Such a configuration of transducers, mounted to a vehicle wheel, is conventional and well known in the art.

FIG. 3B shows a plan view of the components shown in FIG. 3A. The reference axis 26 of longitudinal transducer 23 is preferably oriented at right angles to the axis of rotation 30 of the wheel 20, while the reference axis 27 of transverse transducer 24 is preferably oriented parallel to the axis of rotation 30. Line of sight 28 extends from transducer 23 to the other transducer of a cooperative pair, while line of sight 29 extends from transducer 24 to the other transducer of another cooperative pair, as will be shown presently.

FIG. 3C shows various distances associated with the configuration of FIG. 3B. In addition, for clarity, the longitudinal transducer 23 is shown slightly separated from the axis of rotation 30 of the wheel 20, as is commonly practiced by some equipment manufacturers. An arbitrary but reasonable coordinate system is chosen for the sensor, in which the origin "O" lies along the axis of rotation 30 at the mounting plane of the wheel clamp or adapter 22 onto the wheel 20. The locations of the transducers 23 and 24 have known offsets from this location. The X and Y offsets of the longitudinal transducer 23 are labeled, respectively, DLX and DLY. The X and Y offsets of the transverse transducer 24 are labeled, respectively, DTX and DTY.

FIG. 3C further shows the "steering center" SC, which is a point on the vertical axis about which the wheel is steered. The X and Y offsets of the steering center SC from the origin O are, respectively, WOX and WOY. FIG. 4 shows a plan view of the components of FIG. 3C in which the wheel and sensor assembly have been "steered" to two different directions, thereby illustrating how the wheel steers about the steering center.

It would be desirable to separate the "position" of the wheel 20 from its "orientation", such that the wheel position remains constant as the wheel is steered to point in different directions. To accomplish this, the wheel position would be defined to be the steering center, which, by definition, does not move as the wheel is steered. This poses several complications. First, the rear wheels are generally not steerable, and thus defining their "positions" to be their steering centers is generally meaningless. Second, the distances WOX and WOY, as illustrated in FIG. 3C, are generally not known, although the distances WOX and WOY could be straightforwardly computed from measurements taken during the alignment process at two or more different steering positions of a steerable wheel. Third, and most important, the steering center of a steerable wheel is located somewhere in the interior of the tire/wheel assembly, and thus is not a location to which an alignment technician has access by any physical means. In short, there is no practical use to which knowledge of the location of the steering center can be put, and thus there is no practical reason to compute it.

Accordingly, the "position" of the wheel is defined to be the location of the origin O in FIG. 3. As noted above, this lies along the axis of rotation 30 at the mounting plane of the wheel clamp or adapter 22 onto the wheel 20, and thus it is at a known location relative to the transducers in the sensor assembly 21.

Figure 5:
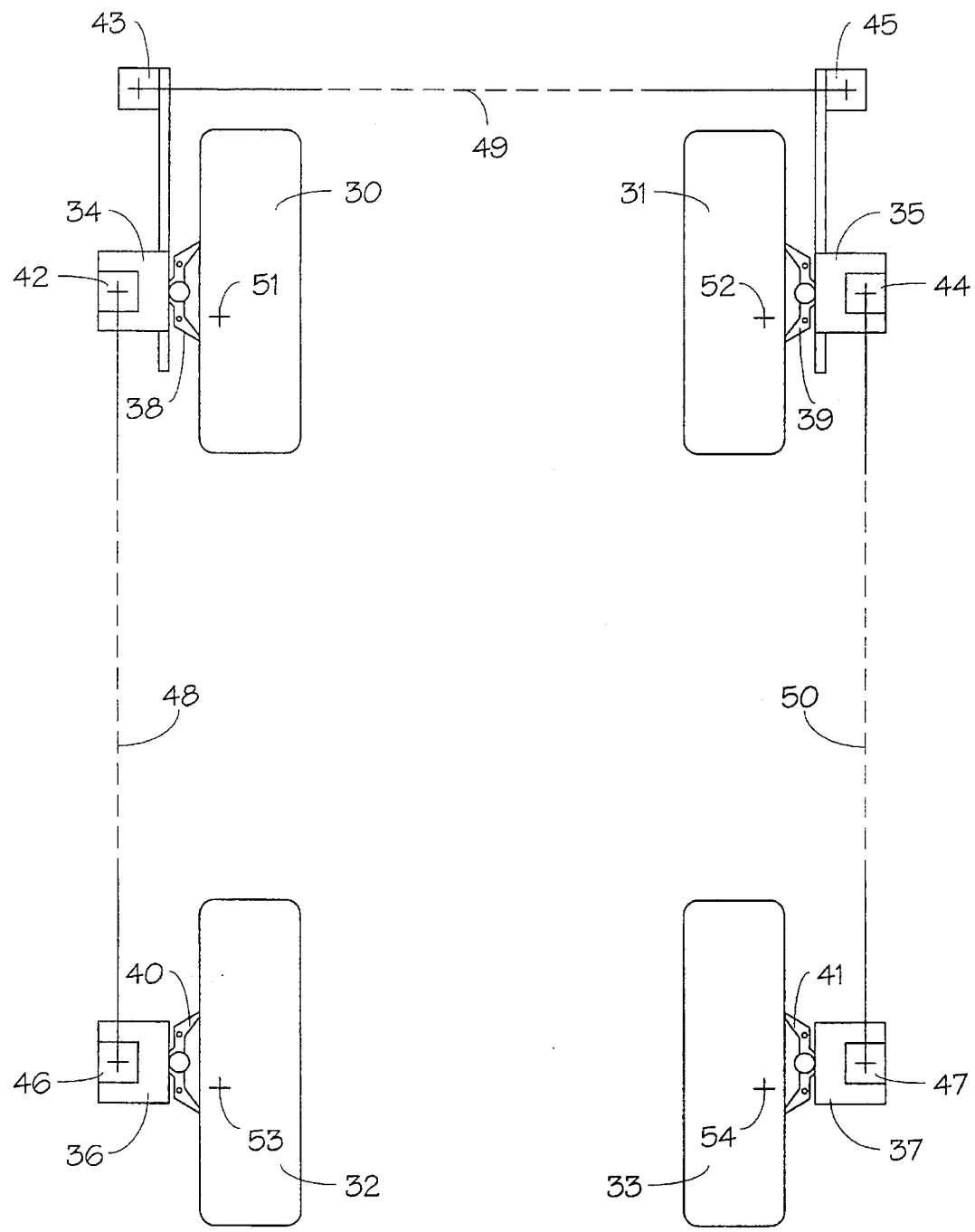
FIG. 5 is a plan view of four vehicle wheels on which are mounted four sensor assemblies via wheel clamps or adapters, showing the common lines of sight between the transducer pairs.

FIG. 5 shows a plan view of four vehicle wheels 30, 31, 32, and 33, onto which four sensor assemblies 34, 35, 36, and 37 have been mounted using wheel clamps or adapters 38, 39, 40, and 41, respectively. Inside the left front sensor 34 are the left front longitudinal transducer 42 and the left front transverse transducer 43. Inside the right front sensor 35 are the right front longitudinal transducer 44 and the right front transverse transducer 45. Inside the left rear sensor 36 is the left rear longitudinal transducer 46. Inside the right rear sensor 37 is the right rear longitudinal transducer 47. The transducers 42 and 46 share a common line of sight 48, the transducers 43 and 45 share a common line of sight 49, and the transducers 44 and 47 share a common line of sight 50.

Figure 5A:
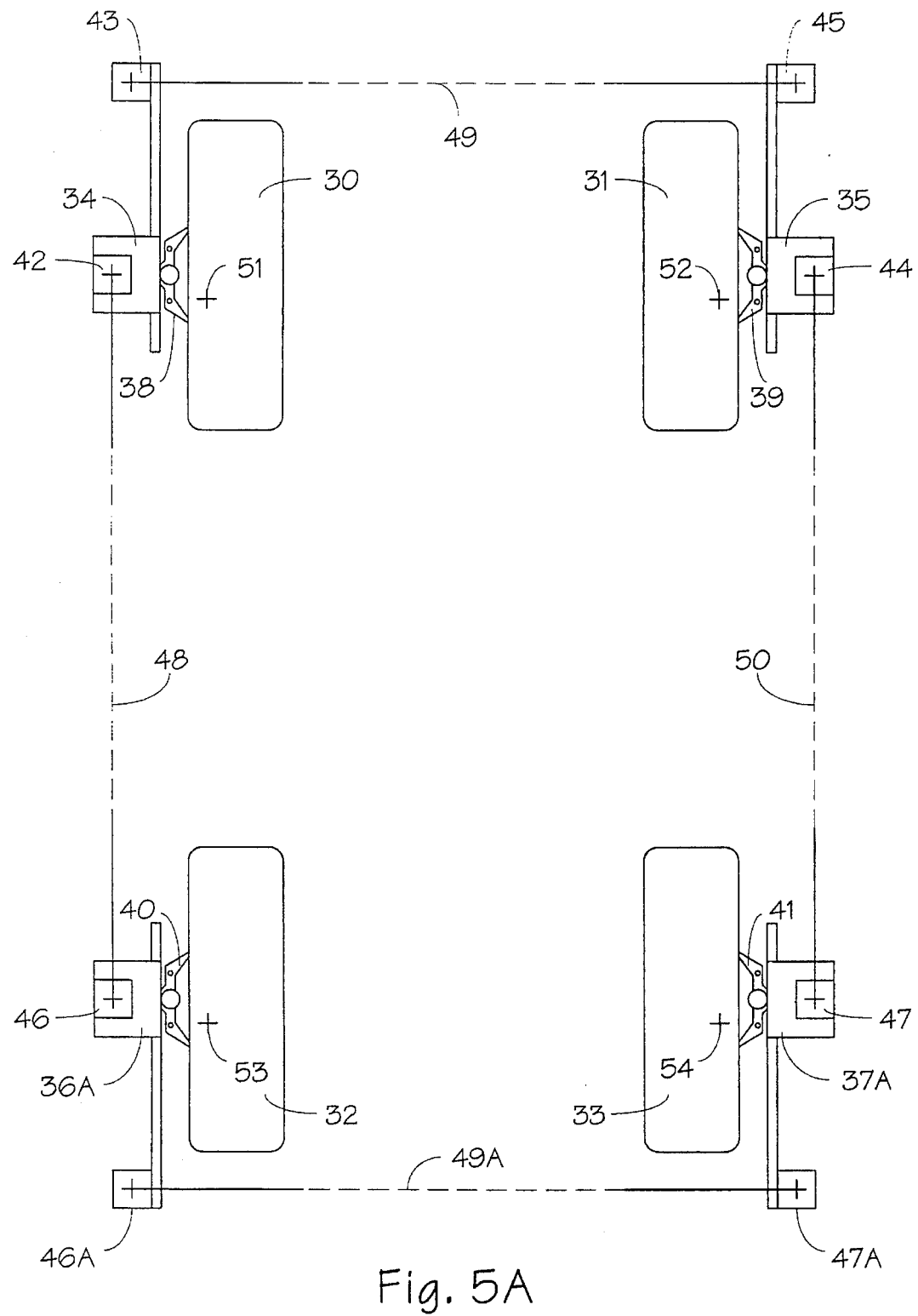
FIG. 5A is a view similar to FIG. 5, showing a fourth pair of transducers in line of sight with each other across the rear of the vehicle.

FIG. 5A is similar to FIG. 5 in all material respects except for the fact that the rear sensor assemblies, labeled 36A and 37A, include rear transverse transducers 46A and 47A. The rear transverse transducers function in the same manner as front transverse transducers 43 and 45, thereby performing measurements for the rear wheels corresponding to the measurements made by transducers 43 and 45 for the front wheels. Rear transverse transducers 46A and 47A share a common line of sight 49A.

As shown in FIG. 5 and 5A, the four wheels 30, 31, 32, and 33 are located at and steer about the four steering centers 51, 52, 53, and 54, respectively. In FIG. 5 and 5A, the four steering centers are located at the four corners of a perfect rectangle. In addition, the four wheels are steered so as to be parallel to each other. This is an "ideal" situation. One viewpoint of wheel alignment is to measure or otherwise determine how the locations and pointing directions of the wheels deviate from this ideal.

Figure 6:
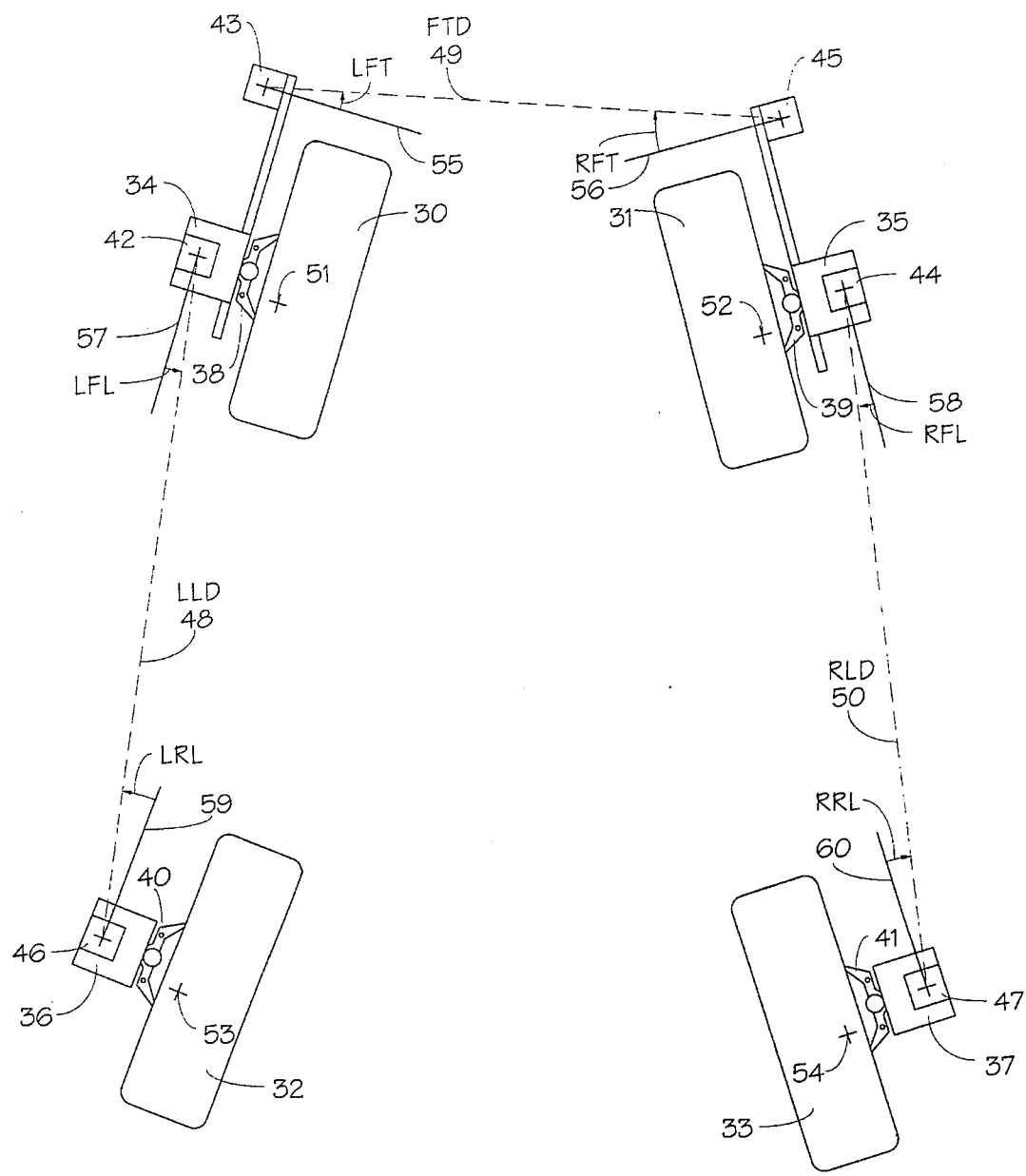
FIG. 6 is a plan view of four vehicle wheels on which are mounted four sensor assemblies via wheel clamps or adapters, with the wheel mispositions greatly exaggerated so as to show the angles and distances measured by the transducers.

FIG. 6 shows the components of FIG. 5 after the wheels 30, 31, 32, and 33 have been moved to new locations such that the steering centers 51, 52, 53, and 54 are not located at the four corners of a rectangle. In addition, the four wheels are steered about their respective steering centers so as to not be parallel to each other. This illustrates clearly the angles and distances which are measured directly by the transducers. Angle LFT, as measured by transducer 43, lies between its reference axis 55 and the line of sight 49. Angle RFT, as measured by transducer 45, lies between its reference axis 56 and the line of sight 49. Angle LFL, as measured by transducer 42, lies between its reference axis 57 and the line of sight 48. Angle RFL, as measured by transducer 44, lies between its reference axis 58 and the line of sight 50. Angle LRL, as measured by transducer 46, lies between its reference axis 59 and the line of sight 48. Angle RRL, as measured by transducer 47, lies between its reference axis 60 and the line of sight 50. Distance FTD, which lies along line of sight 49, is measured by transducer 43 and/or transducer 45. Distance LLD, which lies along line of sight 48, is measured by transducer 42 and/or transducer 46. Distance RLD, which lies along line of sight 50, is measured by transducer 44 and/or transducer 47. The convention is that more positive angles are produced by increasing the "toe in" of the wheels.

Figure 7:
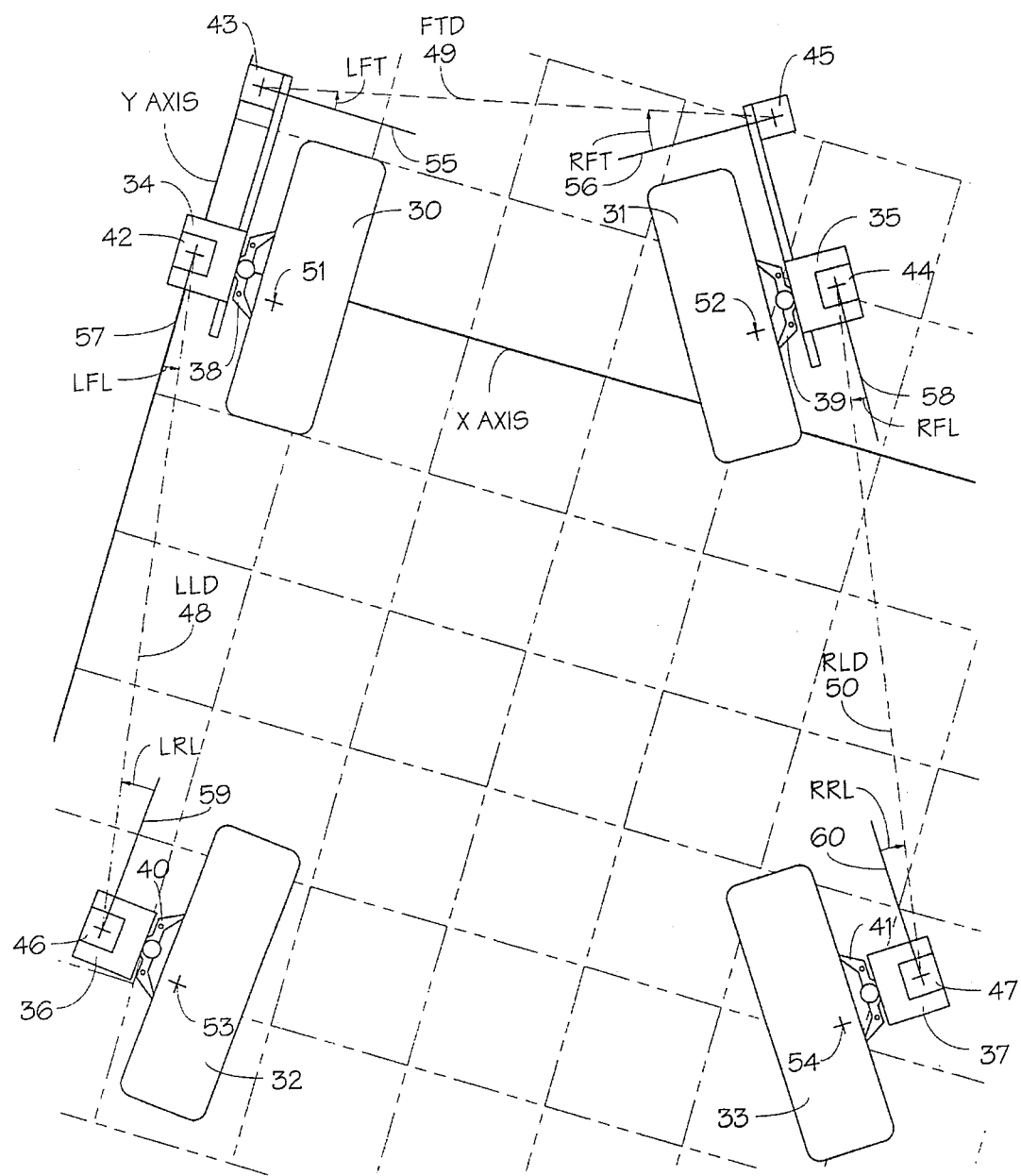
FIG. 7 is a plan view of four vehicle wheels on which are mounted four sensor assemblies via wheel clamps or adapters, superimposed on a measurement coordinate system grid so as to illustrate how transducer and wheel positions may be measured relative to that coordinate system.

FIG. 7 is a duplicate of FIG. 6 which is overlaid onto a coordinate system and grid. The origin and orientation of the grid has been arbitrarily chosen such that its center coincides with the location of the left front longitudinal transducer 42 and its negative Y axis is aligned with the reference axis 57 of the same transducer. Through a process which is explained presently, the locations and orientations of all the various transducers and wheels can be computed relative to this coordinate system from the measurements which are directly made by the transducers. For these computations, the convention is chosen that relative angles are measured in a clockwise direction, and absolute or actual angles are measured in a clockwise direction relative to the positive Y axis.

The process by which this is accomplished is as follows: Begin with the left front longitudinal transducer 42 (lfl). Because it is located at the origin and its reference axis is aligned with the negative Y axis, its (X, Y) location and angular orientation are as follows:

$X_{lfl}=0$ $Y_{lfl}=0$ $\theta_{lfl}=180°$

The locations and orientations of the other transducers and the wheels are computed by beginning at the transducer 42 and working along the lines of sight, using the relative ranges and bearings measured by the transducers and the relative offsets of the transducers and the wheels in the sensor assemblies. To illustrate this, the relative range LLD and relative bearing LFL from transducer 42 (lfl) to transducer 46 (lrl) are measured. The actual bearing of transducer 42 to transducer 46 is determined by offsetting the actual orientation of transducer 42 by the relative bearing of transducer 42 to transducer 46. From this, the (X, Y) location of transducer 46 is computed as:

$X_{lrl}=X_{lfl}+LLD*sin(\theta_{lfl}-LFL)$ $Y_{lrl}=Y_{lfl}+LLD*cos(\theta_{lfl}-LFL)$ The actual orientation of transducer 46 is computed by reversing the actual bearing of transducer 42 to transducer 46, thereby computing the actual bearing of transducer 46 to transducer 42, then offsetting by the relative bearing of transducer 46 to transducer 42:

$\theta_{lrl}=180°+(\theta_{lfl}-LFL)+LRL$

These computations are best described by implementing a set of simple "range and bearing" functions, as follows:

$X=RB_x(X_T, \theta_A, D_R, \theta_R)$ $Y=RB_y(Y_T, \theta_A, D_R, \theta_R)$ $\theta=RB_\theta(\theta_A\theta_{R1}\theta_{R2})$ In these functions, RBx() computes the X coordinate of an object from the (Xt, Yt) coordinate and actual orientation of a different object, as well as the relative range and bearing from that other object. Similarly RBy() computes the Y coordinate. The function RBθ() computes the actual orientation of an object from the actual orientation of another object, the relative bearing from the other object, and the relative bearing to the other object. To implement these functions in computing the location and orientation of transducer 46 from transducer 42, the functions would be used as follows:

$X_{lrl}=RB_x(X_{lfl}, \theta_{lfl}, LLD, -LFL)$ $Y_{lrl}=RB_y(Y_{lfl}, \theta_{lfl}, LLD, -LFL)$ $\theta_{lrl}=RB_\theta(\theta_{lfl}LFL, LRL)$ Thus by inspection, the functions themselves are implemented as follows:

$X_{RBx}(X_t, \theta_A, D_R, \theta_R)=X_t+D_R*sin(\theta_A+\theta_R)$ $Y=RB_y(Y_t, \theta_A, D_R, \theta_R)=Y_t+D_R*cos(\theta_A+\theta_R)$ $\theta=RB_\theta(\theta_A, \theta_{R1}, \theta_{R2})=180°+(\theta_A-\theta_{R1})+\theta_{R2}$ When using the functions, care must be taken to provide the correct algebraic sign for each argument.

Once the location and orientation of the left rear longitudinal transducer 46 has been computed, the location and orientation of the corresponding wheel 32 can be computed. It is straightforward and well known to perform a translation of a coordinate in one coordinate system into a new coordinate system and to perform a rotation of the new coordinate about a point in that new coordinate system. The "translate and rotate" functions to accomplish this are of the form:

$X=TR_x(X_t, Y_t, D_x, D_y, \theta)$ $Y=TR_y(X_t, Y_t, D_x, D_y, \theta)$

In these functions, TRx() computes the X coordinate of the object from the (Xt, Yt) coordinate of the object, the (Dx, Dy) offsets of the object from (Xt, Yt), and the rotation angle θ. TRy() is similar. These functions can be implemented by computing X and Y using the following matrix notation:

$$[X \; Y \; 1] = [(X_t + D_x) \; (Y_t + D_y) \; 1] \begin{bmatrix} \cos\theta & \sin\theta & 0 \\ -\sin\theta & \cos\theta & 0 \\ C_1 & C_2 & 1 \end{bmatrix}$$

where $$C_1 = X_t - X_t^* \cos\theta + Y_t^* \sin\theta$$

$$C_2 = Y_t - X_t^* \sin\theta - Y_t^* \cos\theta$$

Once the location and orientation of the left front longitudinal transducer 42 has been computed, the location and orientation of the left from transverse transducer 43 can be computed. This is performed using the same functions as for computing the position and orientation of the wheel but using instead the offsets of the transverse transducer relative to the longitudinal transducer.

Using a straightforward application of these functions, the locations and orientations of all the transducers and wheels, relative to the arbitrarily chosen coordinate system, can be performed. The following subscripts denote the meanings of the various object, coordinates, and orientations:

lf=left front rf=right front lr=left rear rr=right rear l=longitudinal transducer t=transverse transducer w=wheel The locations and orientations of the transducers and wheel at the left front, in the arbitrarily chosen coordinate system, are computed as follows:

$$X_{lfl} = 0$$

$$Y_{lfl} = 0$$

$$\theta_{lfl} = 180°$$

$$X_{lft} = TR_x(X_{lfl}, Y_{lfl}, DLX-DTX, DLY+DTY, \theta_{lfl}-180°)$$

$$Y_{lft} = TR_y(X_{lfl}, Y_{lfl}, DLX-DTX, DLY+DTY, \theta_{lfl}-180°)$$

$$\theta_{lft} = \theta_{lfl} - 90°$$

$$X_{lfw} = TR_x(X_{lfl}, Y_{lfl}, DLX, DLY, \theta_{lfl}-180°)$$

$$Y_{lfw} = TR_y(X_{lfl}, Y_{lfl}, DLX, DLY, \theta_{lfl}-180°)$$

$$\theta_{lfw} = \theta_{lfl} - 180°$$

The locations and orientations of the transducers and wheel at the left rear, in the arbitrarily chosen coordinate system, are computed as follows:

$$X_{lrl} = RB_x(X_{lfl}, \theta_{lfl}, LLD, -LFL)$$

$$Y_{lrl} = RB_y(Y_{lfl}, \theta_{lfl}, LLD, -LFL)$$

$$\theta_{lrl} = RB_\theta(\theta_{lfl}, LFL, LRL)$$

$$X_{lrw} = TR_x(X_{lrl}, Y_{lrl}, DLX, -DLY, \theta_{lrl})$$

$$Y_{lrw} = TR_y(X_{lrl}, Y_{lrl}, DLX, -DLY, \theta_{lrl})$$

$$\theta_{lrw} = \theta_{lrl}$$

The locations and orientations of the transducers and wheel at the right front, in the arbitrarily chosen coordinate system, are computed as follows:

$$X_{rfl} = RB_x(X_{lfl}, \theta_{lfl}, FTD, -LFT)$$

$$Y_{rfl} = RB_y(Y_{lfl}, \theta_{lfl}, FTD, -LFT)$$

$$\theta_{rfl} = RB_\theta(\theta_{lfl}, LFT, -RFT)$$

$$X_{rft} = TR_x(X_{rfl}, Y_{rfl}, DLX-DTX, -DTY-DLY, \theta_{rfl}-270°)$$

$$Y_{rft} = TR_y(X_{rfl}, Y_{rfl}, DLX-DTX, -DTY-DLY, \theta_{rfl}-270°)$$

$$\theta_{rft} = \theta_{rfl} - 90°$$

$$X_{rfw} = TR_x(X_{rfl}, Y_{rfl}, -DLX, DLY, \theta_{rfl}-180°)$$

$$Y_{rfw} = TR_y(X_{rfl}, Y_{rfl}, -DLX, DLY, \theta_{rfl}-180°)$$

$$\theta_{rfw} = \theta_{rfl} - 180°$$

The locations and orientations of the transducers and wheel at the right rear, in the arbitrarily chosen coordinate system, are computed as follows:

$$X_{rrl} = RB_x(X_{rfl}, \theta_{rfl}, RLD, RFL)$$

$$Y_{rrl} = RB_y(Y_{rfl}, \theta_{rfl}, RLD, RFL)$$

$$\theta_{rrl} = RB_\theta(\theta_{rfl}, -RFL, -RRL)$$

$$X_{rrw} = TR_x(X_{rrl}, Y_{rrl}, -DLX, -DLY, \theta_{rrl})$$

$$Y_{rrw} = TR_y(X_{rfl}, Y_{rrl}, -DLX, -DLY, \theta_{rrl})$$

$$\theta_{rrw} = \theta_{rrl}$$

Figures 8A, 8B:
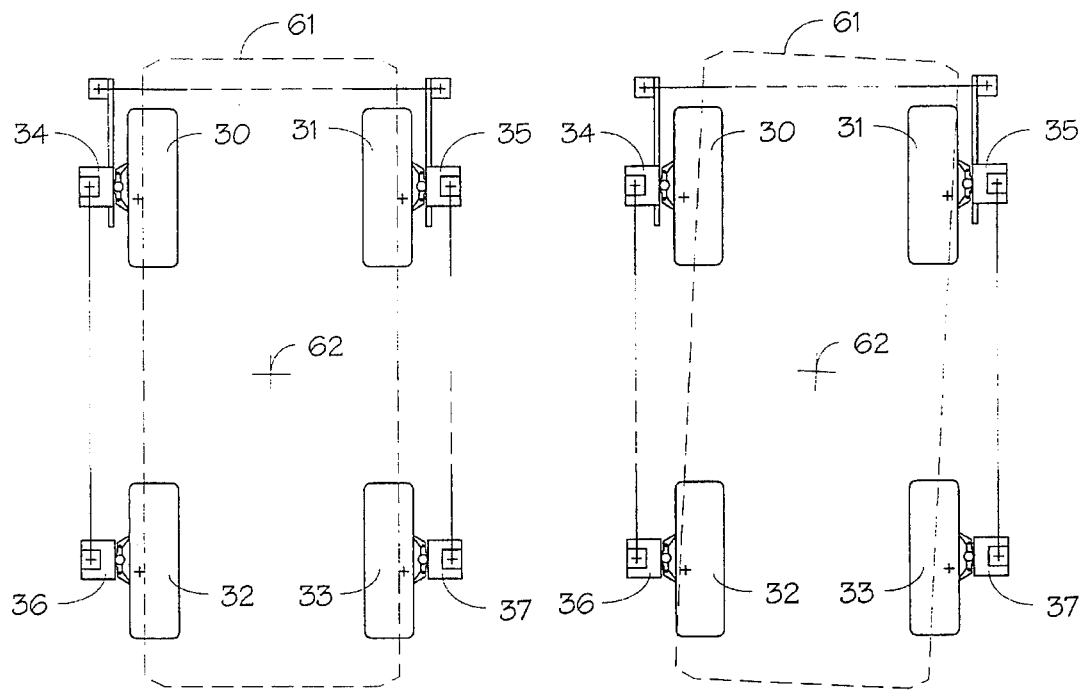
FIG. 8A is a plan view of four vehicle wheels on which are mounted four sensor assemblies via wheel clamps or adapters, with an outline of a vehicle body or frame superimposed thereon, thereby showing an idealized measurement configuration.
FIG. 8B is a plan view of four vehicle wheels on which are mounted four sensor assemblies via wheel clamps or adapters, with an outline of a vehicle body or frame which has been rotated clockwise superimposed thereon, thereby showing that the sensor measurements are unaffected by the mislocation of the body relative to the wheels, or vice-versa.

An inspection of FIG. 7 shows that, if the coordinate system is defined to be fixed with respect to any one of the transducers, then the coordinates of the other transducers and wheels will be dependent on the pointing direction of the wheel on which that transducer is mounted. After the coordinates and orientations are computed as described above, they must be further transformed into a different coordinate system before they can be of any practical use. It is reasonable that the desired coordinate system would be relative to the body or frame of the vehicle, as this would allow the determination of the offsets of the various wheels from their optimal locations relative to that body or frame. FIG. 8A and FIG. 8B illustrate the nature of this coordinate system.

FIG. 8A shows a plan view of the four wheels 30, 31, 32, and 33 with the attached sensors 34, 35, 36, and 37, as in FIG. 5. Superimposed onto this is an outline which represents the body or frame 61 of the vehicle. FIG. 8A shows the body or frame 61 in perfect alignment with the wheels and sensors in an "ideal" configuration.

FIG. 8B is a duplicate of FIG. 8A in which the body or frame 61 has been rotated slightly clockwise about its center 62. It is clearly apparent that the transducers of FIG. 8B would measure exactly the same angles and distances as those in FIG. 8A. Transducers which are mounted to the wheels and which do not interact with the body or frame cannot make measurements which allow the coordinates and/or orientations of the wheels to be computed relative to the body or frame.

Figures 9A, 9B:
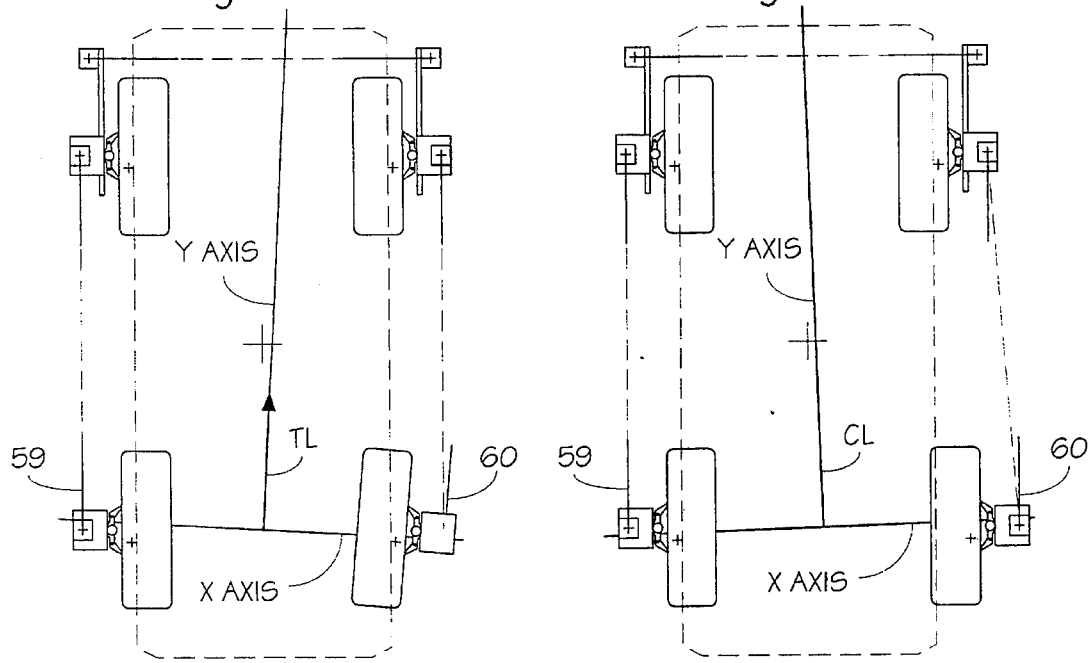
FIG. 9A is a plan view of four vehicle wheels on which are mounted four sensor assemblies via wheel clamps or adapters, with an outline of a vehicle body or frame superimposed thereon, thereby showing the unsuitability of using the rear axle thrust line as a reference frame for measuring actual wheel positions.
FIG. 9B is a plan view of four vehicle wheels on which are mounted four sensor assemblies via wheel clamps or adapters, with an outline of a vehicle body or frame superimposed thereon, thereby showing the unsuitability of using the sensor center line as a reference frame for measuring actual wheel positions.

FIG. 9A illustrates this further by showing a duplicate of FIG. 8A in which the right rear wheel 33 has been rotated clockwise about its steering center SC. The thrust line TL, which is determined as the bisector of the angle formed by reference axis 59 and reference axis 60, is shown as defining the Y axis. The X axis is somewhat arbitrarily chosen such that the origin of the coordinate system thus formed lies at the center of the rear axle. Even though the thrust line is an old and valuable concept in wheel alignment, FIG. 9A shows clearly that it is inappropriate as the axis of a coordinate system to define the locations of the wheels, because it is itself determined by the net steering direction of the rear wheels. For example, it shows that the left front wheel 30 and the right front wheel 31 are not equidistant from the Y axis of the coordinate system, even though the two wheels have the same left/right offsets relative to the body or frame.

FIG. 9B illustrates this further by showing a duplicate of FIG. 8A in which the right rear wheel 33 has been offset outward a short distance. The center line CL, which is determined as the bisector of the angle formed by line of sight 48 and line of sight 49, is shown as defining the Y axis. The X axis is somewhat arbitrarily chosen such that the origin of the coordinate system thus formed lies at the center of the rear axle. Even though the center line is an old and valuable concept in wheel alignment, FIG. 9B shows clearly that it is inappropriate as the axis of a coordinate system to define the locations of the wheels, because it is itself determined by the locations of the wheels. For example, it shows in FIG. 9B that the left rear wheel 32 and the right rear wheel 33 are equidistant from the Y axis of the coordinate system, even though the two wheels have different left/right offsets relative to the body or frame.

Figures 10A, 10B:
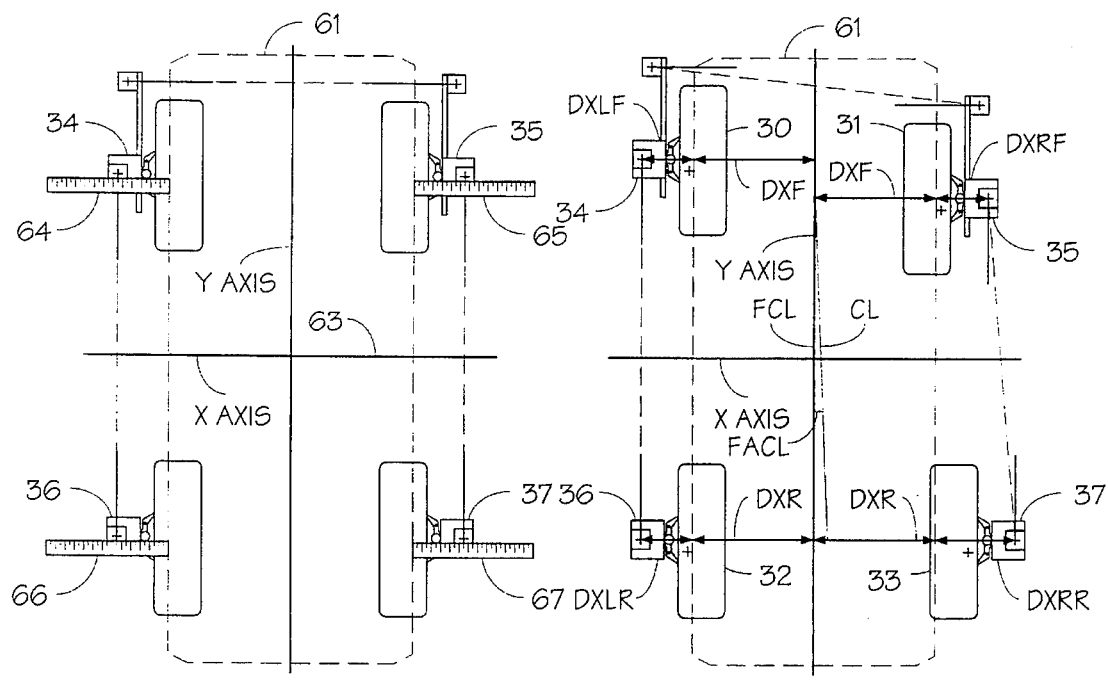
FIG. 10A is a plan view of four vehicle wheels on which are mounted four sensor assemblies via wheel clamps or adapters, with an outline of a vehicle body or frame superimposed thereon, thereby showing the suitability of measuring the position of the vehicle body or frame relative to the sensors using rulers or similar devices.
FIG. 10B is a plan view of four vehicle wheels on which are mounted four sensor assemblies via wheel clamps or adapters, with an outline of a vehicle body or frame superimposed thereon, thereby showing how the body or frame center line is determined by the measurements performed as shown in FIG. 10A.

FIG. 10A is a duplicate of FIG. 8A which has been superimposed onto a coordinate system 63. As in FIG. 8A, this is an "idealized" situation in which the four wheels 30, 31, 32, and 33 lie at the four comers of a rectangle and are parallel to its sides. Ruler 64 serves to illustrate the use of an actual ruler or other distance measuring device to measure the distance from a point on the left front sensor 34 to the left side of the body or frame 61, approximately at the location of the wheel 30. For example, a measuring device such as that disclosed below in connection with FIGS. 12–15 would work adequately.

In a similar manner, rulers 65, 66, and 67 are shown at the corresponding wheels 31, 32, and 33. The use of rulers, tape measures, or similar devices in the manner illustrated in FIG. 10A has been common practice for use with heavy trucks for several years with alignment systems manufactured by the assignee of this application. Ruler 64 is used to measure distance DXLF, as shown in FIG. 10B. Similarly, ruler 65 measures distance DXRF, ruler 66 measures distance DXLR, and ruler 67 measures distance DXRR.

It is reasonable to define the Y axis as lying along the longitudinal center line FCL of the body or frame of the vehicle as is shown in FIG. 10B. This Y axis lies equidistant between the left and right sides of the body or frame at the front end and rear end. Distances DXF and DXR illustrate this in FIG. 10B. The sensor center line CL is normally used as the reference axis for computing the thrust angle and individual toe angles of the rear wheels. This center line CL is very closely approximated as lying equidistant at its front end between the left front longitudinal transducer 42 and the right front longitudinal transducer 44, and equidistant at its rear end between the left rear longitudinal transducer 46 and the right rear longitudinal transducer 47. Angle FACL is the angle between the preferred Y axis as shown in FIG. 10B and the sensor center line. Manual measurements of distances DXLF, DXRF, DXLR, and DXRR, as shown in FIG. 10A and FIG. 10B, are made and used to approximately compute FACL by the following:

$$ACL = \tan^{-1} \frac{(D_{XLF} - D_{XRF}) + (D_{XRR} - D_{XLR})}{2 * \text{WHEELBASE}}$$

Angle FACL is then subtracted from the left rear toe angle and from the thrust angle, and it is added to the right rear toe angle, thereby referencing these angles to the body or frame center line FCL. The front individual toe angles are referenced in the usual manner to the thrust line of the rear wheels, and so are unaffected by this offset. This is very advantageous when aligning heavy trucks, as it results in the forces exerted by pulling a heavy trailer to be parallel to the frame rails, thereby improving handling and safety and reducing wear and tear.

Figure 10C:
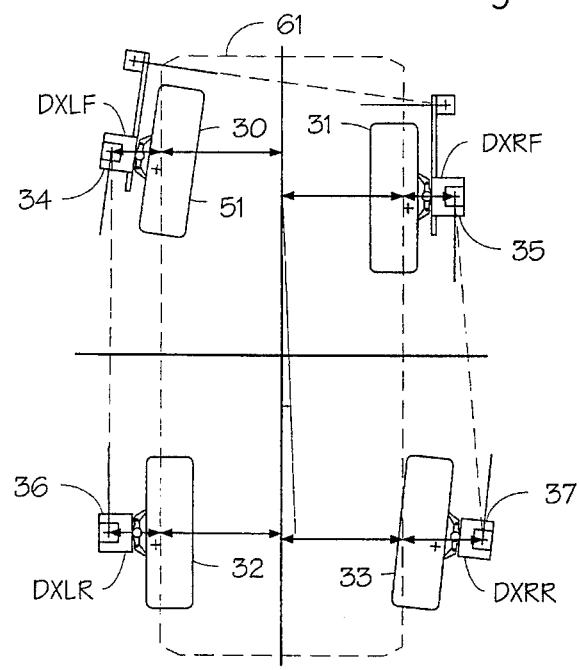
FIG. 10C is a plan view of four vehicle wheels on which are mounted four sensor assemblies via wheel clamps or adapters, with an outline of a vehicle body or frame superimposed thereon, thereby showing the imperfections in the methodology illustrated in FIG. 10B.

FIG. 10C is similar to FIG. 10B, except that the left front wheel 30 has also been steered slightly clockwise, as has the right rear wheel 33. It is readily apparent from FIG. 10C that distance DXLF serves to locate the side of the body or frame relative to the sensor 34, but, because the direction of the measurement point on the body or frame 61 relative to the sensor 34 is not known, simply measuring distance DXLF imprecisely locates the body relative to the sensor 34 and wheel 30. In real-world use, the steering angles of wheels 30 and 31 are very small or are purposely made symmetric relative to the sensor center line CL when such measurements are made, thus allowing the method shown in FIG. 10A–10C to provide very reasonable alignment of the drive wheels to the vehicle body or frame.

Figure 11A:
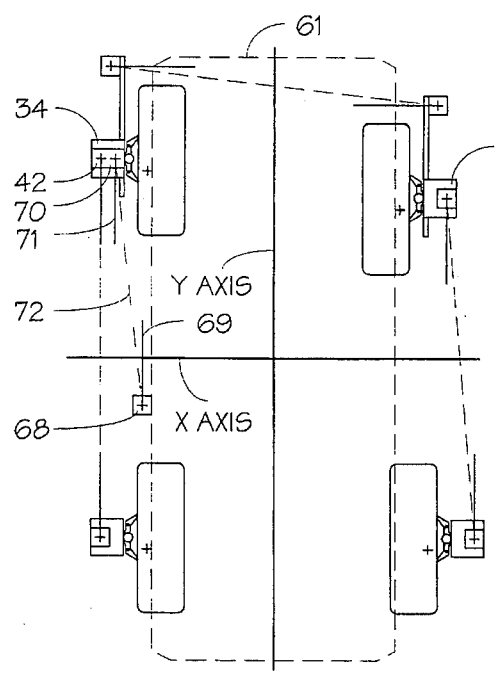
FIG. 11A is a plan view of four vehicle wheels on which are mounted four sensor assemblies via wheel clamps or adapters, with an outline of a vehicle body or frame superimposed thereon, showing how the position of the body or frame relative to the sensors can be measured using a pair of measurement transducers which are capable of measuring relative range and bearing, one of which is attached in a known position to the body or frame and the other of which is attached in a known position to a wheel-mounted sensor.

FIG. 11A shows an additional transducer 68 which is mounted to the body or frame 61 at a predetermined location. This transducer is in line of sight 72 with another transducer 70 which is mounted at a known location in one of the wheel-mounted sensor units. FIG. 11A shows transducer 70 mounted in the left front sensor 34, although it could be mounted in any of the sensor units. The reference axis 69 of transducer 68 has a known relationship with the body or frame 61, thus allowing the transducer 68 to represent both the location and orientation or the body or frame. Similarly, the reference axis 71 of transducer 70 has a known relationship with the sensor 34. In the same manner as previously described, this arrangement allows the location and orientation of the known mounting point of the transducer 68 on the body or frame to be computed relative to the arbitrary coordinate system. Since the transducer 68 is at a known location and orientation relative to the body or frame 61, it is straightforward to transform all the computed coordinates and orientations to be relative to a coordinate system which is defined relative to the body or frame 61. This determines the locations and orientations of all the wheels relative to the body or frame 61.

Once the coordinates of the wheels are determined in a coordinate system which is relative to the body or frame 61, it is straightforward to compute certain alignment parameters of the wheels. For example, the wheelbase measurement of the left side of the vehicle is simply the magnitude of the difference between the Y coordinates of the left wheels 30 and 32. Similarly, the wheelbase measurement of the right side of the vehicle is simply the magnitude of the difference between the Y coordinates of the right wheels 31 and 33. The track width of the front end of the vehicle is simply the magnitude of the difference between the X coordinates of the front wheels 30 and 31. Similarly, the track width of the rear end of the vehicle is simply the magnitude of the difference between the X coordinates of the rear wheels 32 and 33.

It is very important to note that only by measuring the coordinates of the wheels relative to the body or frame 61 can the actual offset and set back parameters of the wheels be determined. The offset of a wheel is simply the difference between the X coordinate of the wheel and the specification for the X coordinate. The relative offset of an axle is the difference between offsets of the wheels of the axle, which is simply the sum of the X coordinates of the wheels of the axle. Similarly, the set back of a wheel is simply the difference between the Y coordinate of the wheel and the specification for the Y coordinate. The relative set back of one wheel of an axle relative to the other is simply the difference between the Y coordinates of the wheels.

Figure 11B:
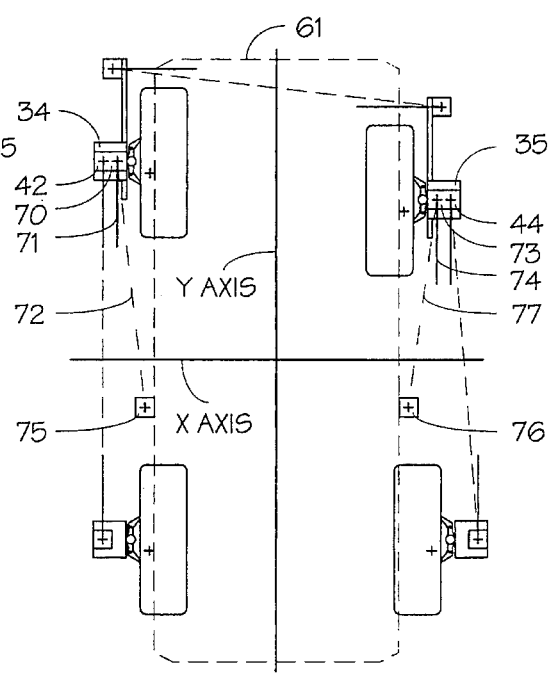
FIG. 11B is a plan view of four vehicle wheels on which are mounted four sensor assemblies via wheel clamps or adapters, with an outline of a vehicle body superimposed thereon, showing how the position of the body or frame relative to the sensors can be measured using a pair of measurement transducers, each of which is mounted in a known position to a wheel-mounted sensor, each using a corresponding line-of-sight reference which is mounted in a known position to the vehicle body or frame.

The system shown in FIG. 11A can be difficult to apply due to the requirement of mounting transducer 68 at a predetermined orientation on the body or frame 61. This is overcome as shown in FIG. 11B by mounting two "anchors" 75 and 76 to the body or frame 61. An "anchor" is a device which locates one end of the line of sight it shares with a cooperative transducer, but which is itself not able to measure anything. This allows the cooperative transducer to measure the range and bearing to the anchor. An anchor might consist of only the emitter or emitters and associated driver of an electro-optical transducer system.

In this manner, anchor 75 is mounted at a predetermined location on the left side of the body or frame 61 to be in line of sight 72 with transducer 70 in the left from sensor 34, while anchor 76 is mounted at a predetermined location on the right side of the body or frame 61 to be in line of sight 77 with transducer 73 in the right front sensor 35. This allows anchors 75 and 76 to represent both the location and orientation of the body or frame 61. In the same manner as previously described, this arrangement allows the ranges and bearings of the mounting points of anchors 75 and 76 on the body or frame to be computed relative to the arbitrary coordinate system. Since the anchors 75 and 76 are at known locations relative to the body or frame 61, it is straightforward to transform all the computed coordinates and orientations to be relative to a coordinate system which is defined relative to the body or frame 61. This determines the locations and orientations of all the wheels relative to the body or frame 61.

Figure 12:
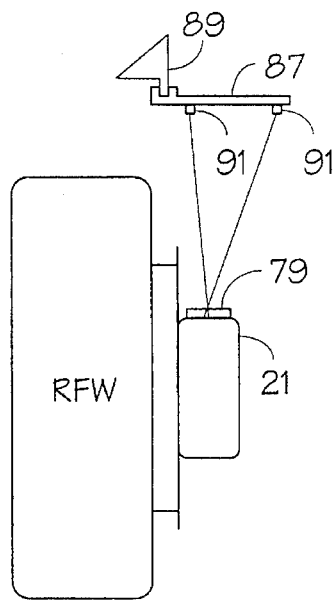
FIG. 12 is a simplified elevation showing vehicle position measuring apparatus mounted on a vehicle.
Figure 13:
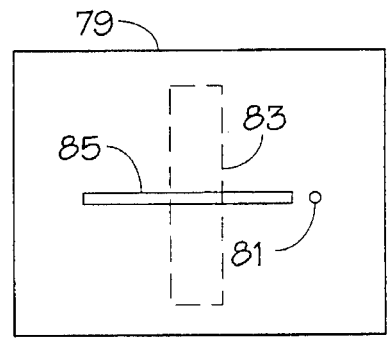
FIG. 13 is a top plan of a portion of the apparatus of FIG. 12.
Figure 14:
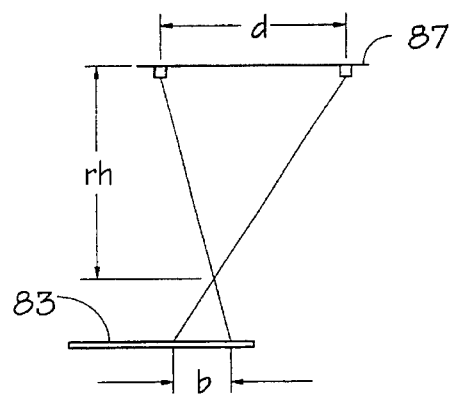
FIG. 14 is a schematic diagram illustrating the determination of ride height using the apparatus of FIG. 12.

Turning to FIG. 12, it can be seen that the distance from any sensor assembly 21 to a predetermined position with respect to the vehicle frame may readily be measured using detectors such as those described above. In addition, this same apparatus may be used to measure vehicle ride height, if desired. More specifically in FIG. 12, sensor unit 21 is shown removably mounted to a wheel (for purposes of illustration the right front wheel RFW). Sensor unit 21 has fixedly mounted thereto a sensor unit 79, which as will become apparent includes an emitter 81 (FIG. 13) and an active pixel array detector 83 (FIG. 14). More specifically, the ride height/offset sensor unit 79 has emitter 81 disposed on the top thereof, adjacent a slit 85 in the top of unit 79. The detector 83, which is preferably a linear CCD array detector, is disposed at the bottom of unit 79. Note that ride height/offset unit 79 is mounted in fixed geometrical relationship with respect to the wheel of the vehicle.

Emitter 81 is positioned so as to project illumination upwardly (as shown in FIG. 12) when sensor unit 21 is mounted on a vehicle wheel. The radiation (preferably infrared) projected by emitter 81 strikes a reflector unit 87 removably mounted by the technician/user on a fender 89 (or other suitable surface) of the vehicle. The vertical distance between ride height/offset unit 79 and reflector unit 87 is a measure of the ride height of the vehicle.

Reflector unit 87 holds in fixed known relative position a pair of corner reflective cubes 91. Such cubes are known in the art and have the property of reflecting light directed at them back at the light source along a parallel path. Radiation from emitter 81, therefore, is directed upwardly toward the corner reflective cubes 91, which reflect that radiation back downwardly through slit 85 onto CCD detector 83.

Figure 15:
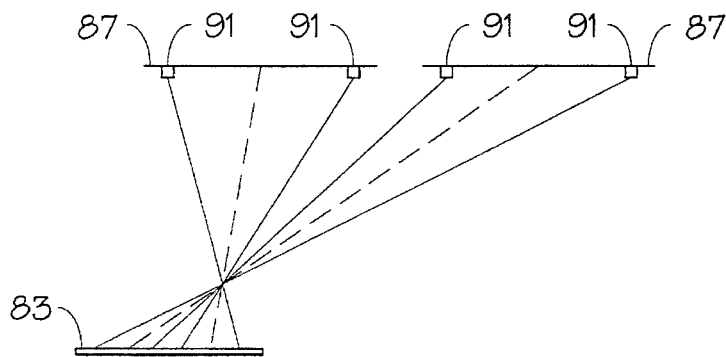
FIG. 15 is a schematic diagram illustrating the determination of wheel offset distance using the apparatus of FIG. 12.

Determination of ride height and wheel offset distance using units 79 and 87 is illustrated in FIGS. 14 and 15. In FIG. 14, the distance "rh" between slit 85 and the reflector unit is the ride height (or a distance differing from the ride height only by a known constant). The distance "d" is the spacing between the two corner reflective cubes 91 and is fixed and known. The distance "d" should be wider than the apparent separation of the emitter and the detector when viewed from the reflector.

The radiation directed by emitter 81 toward the cubes is reflected back to detector 83 where it forms the pair of separated peaks shown, which peaks in the detector output are separated by a distance "b". The distance b varies with ride height rh. This distance between peaks is determined by a suitable microprocessor, to which the output of detector 83 is supplied.

Although the ride height may be determined given the peak to peak distance "b" in a number of ways, it is preferred that it be determined by using a calibration constant. Reflector unit is held by a suitable jig at a fixed, known distance, "rhcal", and at a fixed, known position with respect to detector 83. The output of detector 83 is examined to find the calibration peak to peak distance, "bcal." Thereafter, the actual ride height is determined by using the calibration measurement, bcal, and ride height calibration distance, rhcal, and the current peak to peak measurement, "b." The equation relating these quantities is

*rh=bcal\*rhcal/b.*

Many equivalent equations could also be used.

FIG. 15 illustrates the determination of wheel offset distance using the present apparatus. The horizontal position of reflector unit 87 with respect to the detector 83 is a measure of wheel offset distance. When the reflector unit is disposed in a position such as the leftmost one shown in FIG. 15, the reflected radiation falls on average to the right of the reflected radiation position when the reflector unit is disposed more to the right (see phantom drawing of reflector unit 87). That is, the absolute position of the radiation pattern on detector 83 is a measure of wheel offset distance. This absolute position is relatively easy to obtain since the output of the CCD detector array provides absolute position information with respect to an arbitrary reference position. The position of either peak, or the average of the positions of both peaks, or some other combination of the detector output may be used to measure wheel offset. It is preferred that the absolute position of each peak be determined and then averaged to determine wheel offset, but any other method could be used as well. Of course various other ways could be used to determine the distance between the relevant sensor assembly and a predetermined position with respect to the vehicle frame.

In view of the above it will be seen that the various objects and features of the invention are achieved, and other advantageous results obtained. It should be understood that the description contained herein is illustrative only and is not to be taken in a limiting sense.

What is claimed is:

1. A wheel alignment apparatus for determining the alignment positions and orientations of vehicle wheels in relation to an arbitrary coordinate system comprising:

at least one pair of measurement transducers, each transducer being mounted on a separate vehicle wheel in a known geometrical relationship to its corresponding wheel, at least one transducer of the pair being capable of measuring a relative bearing to the other transducer of the pair, and at least one transducer of the pair being capable of measuring a range to the other transducer of the pair;

a computer being operatively connected to each transducer, said computer being responsive to the measured range and relative bearing to determine the coordinates of the wheels on which the transducers are mounted in an arbitrary coordinate system, said computer being further responsive to transform said coordinates to corresponding coordinates in a desired reference frame, so as to provide measurements of actual wheel positions and orientations in said desired reference frame.

2. The wheel alignment apparatus as set forth in claim 1 wherein the desired reference frame is defined with respect to a sensor center line, the locations of said transducers defining said sensor center line.

3. The wheel alignment apparatus as set forth in claim 1 wherein the desired reference frame is defined with respect to a vehicle thrust line.

4. The wheel alignment apparatus as set forth in claim 1 wherein the desired reference frame is defined with respect to a vehicle frame center line.

5. The wheel alignment apparatus as set forth in claim 1 wherein the desired reference frame is defined with respect to a vehicle body center line.

6. The wheel alignment apparatus as set forth in claim 1 further including at least one element disposed at a predetermined location on a frame of the vehicle, said element being configured to operate in conjunction with a transducer to determine the range and relative bearing of the predetermined location.

7. The wheel alignment apparatus as set forth in claim 6 wherein the element includes an emitter for transmitting radiation toward said transducer.

8. The wheel alignment apparatus as set forth in claim 6 further including a second element disposed at a second predetermined location on the frame of the vehicle, said second element being configured to operate in conjunction with another transducer to determine the range and relative bearing of the second predetermined location.

9. The wheel alignment apparatus as set forth in claim 8 wherein the first and second predetermined positions are fixed with respect to the vehicle frame and the computer is responsive to the range and bearing measurements for the first and second elements to determine the wheel positions with respect to the vehicle frame.

10. The wheel alignment apparatus as set forth in claim 8 wherein the first and second predetermined positions are fixed with respect to the vehicle body and the computer is responsive to the range and bearing measurements for the first and second elements to determine the wheel positions with respect to the vehicle body.

11. The wheel alignment apparatus as set forth in claim 6 wherein said transducer which operates in conjunction with said element is disposed adjacent one of the measurement transducers.

12. The wheel alignment apparatus as set forth in claim 1 wherein the transducers are mounted to said wheels via adapters, said adapters defining the known geometrical relationship between each transducer and its corresponding wheel.

13. A wheel alignment apparatus for determining the position and orientation of front and rear vehicle wheels comprising:

six measurement transducers mounted to vehicle wheels such that two transducer are mounted on each of the front wheels and one transducer is mounted on each of the rear wheels, said transducers being grouped into three pairs such that at least one transducer of each pair is capable of measuring the distance to the other transducer which is located in its line-of-sight and such that each transducer is capable of measuring relative bearing to the other transducer associated with the pair based upon an angle formed between each transducer's line-of-sight and its reference axis, said pairs including:

(a) a first pair including one transducer associated with each front wheel, said first pair measuring the transverse distance between said transducers and the relative angular alignment of the front wheels, (b) a second pair including one transducer associated with the front wheel located on the left side of the vehicle and one transducer associated with the rear wheel located on the same side of the vehicle, said second pair measuring the longitudinal distance between said transducers and the relative angular alignment of the wheels located on this left side of the vehicle; and (c) a third pair including one transducer associated with the front wheel located on the right side of the vehicle and one transducer associated with the rear wheel located on the same side of the vehicle, said third pair measuring the longitudinal distance between said transducer pair and the relative angular alignment of the wheels located on this right side of the vehicle;

a computer operatively connected to each transducer, said computer being responsive to the measured ranges and relative bearings to determine the coordinates of the wheels in said arbitrary coordinate system, and to transform said coordinates into corresponding coordinates in a desired reference frame so as to provide actual wheel alignment positions and orientations in the desired reference frame; and a display for displaying the alignment positions and orientations of the vehicle wheels.

14. The wheel alignment apparatus as set forth in claim 13 wherein said computer is further responsive to the relative bearing measurements to determine toe alignment angles.

15. The wheel alignment apparatus as set forth in claim 13 further including a pair of additional transducers which are disposed at corresponding vehicle wheels to determine the position of their respective wheels with respect to a corresponding reference frame.

16. The wheel alignment apparatus as set forth in claim 15 wherein the reference frame is defined by separate reference points on the vehicle frame for each additional transducer.

17. The wheel alignment apparatus as set forth in claim 15 wherein the reference frame defined by separate reference points on the vehicle body for each additional transducer.

18. The wheel alignment apparatus as set forth in claim 15 wherein the reference frame is defined by a pair of elements disposed at respective predetermined positions on the vehicle, each element cooperating with its associated transducer to determine the range and bearing of the predetermined positions with respect to the corresponding transducers.

19. The wheel alignment apparatus as set forth in claim 18 wherein one element is mounted on the left side of the vehicle and the other element is mounted on the right side of the vehicle.

20. The wheel alignment apparatus as set forth in claim 15 wherein said computer computes the ranges and relative bearings of the elements to determine the positions and orientations of all wheels relative to a reference frame defined by the positions of said elements.

21. The wheel alignment apparatus as set forth in claim 13 further including seventh and eighth measurement transducers, said seventh and eighth transducers forming a fourth pair with one transducer of the pair being associated with the rear wheel located on the right side of the vehicle and one transducer of the pair being associated with the rear wheel located on the left side of the vehicle, said fourth pair measuring the transverse distance between said seventh and eighth transducers and the relative angular alignment of the rear wheels.

22. The wheel alignment apparatus as set forth in claim 13 wherein the desired reference frame is defined with respect to a sensor center line, the location of said transducers defining said sensor center line.

23. The wheel alignment apparatus as set forth in claim 13 wherein the desired reference frame is defined with respect to a vehicle thrust line.

24. The wheel alignment apparatus as set forth on claim 13 wherein the desired reference frame is defined with respect to a vehicle frame center line.

25. The wheel alignment apparatus as set forth in claim 13 wherein the desired reference frame is defined with respect to a vehicle body center line.

26. The wheel alignment apparatus as set forth in claim 13 further including at least one element disposed at a predetermined location on a frame of the vehicle, said elements being configured to operate in conjunction with a transducer to determine the range and relative bearing of the predetermined location.

27. The wheel alignment apparatus as set forth in claim 26 wherein the element includes an emitter for transmitting radiation toward said transducer.

28. The wheel alignment apparatus as set forth in claim 26 further including a second element disposed at a second predetermined location on the frame of the vehicle, said second element being configured to operate in conjunction with another transducer to determine the range and relative bearing of the second predetermined location.

29. The wheel alignment apparatus as set forth in claim 28 wherein the first and second predetermined positions are fixed with respect to the vehicle frame and the computer is responsive to the range and bearing measurements for the first and second elements to determine the wheel positions with respect to the vehicle frame.

30. The wheel alignment apparatus as set forth in claim 28 wherein the first and second predetermined positions are fixed with respect to the vehicle body and the computer is responsive to the range and bearing measurements for the first and second elements to determine the wheel positions with respect to the vehicle body.

31. The wheel alignment apparatus as set forth in claim 26 wherein said transducer which operates in conjunction with said element is disposed adjacent one of the measurement transducers.

32. The wheel alignment apparatus as set forth in claim 13 wherein the transducers are mounted to said wheels via adapters, said adapters defining the known geometrical relationship between each transducer and its corresponding wheel.

* * * * *